3,803,118
CHEMICAL COMPOUNDS AND PROCESSES
FOR PREPARING THEM
Carl D. Bennett, Elizabeth, N.J., assignor to
Merck & Co., Inc., Rahway, N.J.
No Drawing. Filed Mar. 26, 1971, Ser. No. 128,520
Int. Cl. C07c 103/52
U.S. Cl. 260—112.5                        13 Claims

ABSTRACT OF THE DISCLOSURE

Novel synthetic peptide composition, valylhistidyl leucyl-threonyl-propyl - glutamyl - glutamyl-lysylseryl-alanine (hereinafter designated val-his-leu-thr-pro-glu-glu-lys-ser-ala, and also referred to herein as hemopeptide H) is prepared by controlled, stepwise synthesis starting with individual amino acid components. Hemopeptide H is useful for inducing release and/or synthesis of hormone substances in living systems.

---

This invention is concerned generally with hemopeptide H, a new synthetic peptide having the peptide chain val-his-leu-thr - pro - glu-glu-lys-ser-ala; to novel processes for preparing hemopeptide H by controlled stepwise synthesis whereby individual amino acid components of the peptide chain are connected in the stated sequence by peptide linkages; and to intermediates in said novel processes. More particularly, hemopeptide H is prepared either by successively introducing each of the individual amino acid components stepwise in sequence, or by synthesizing two or more segments of the peptide chain followed by coupling of such segments in the stated sequence.

Hemopeptide H is useful in inducing release and/or synthesis of hormone substances by living systems, and is particularly valuable for effecting release of growth hormone by cells of the anterior pituitary. Hemopeptide H is conveniently administered by injection, preferably by intra-carotid injection where release and/or synthesis of growth hormone is desired.

The abbreviated designations, which are used herein for the amino acid components, their derivatives, and certain preferred protecting groups employed in this invention are as follows.

| Amino acid: | Abbreviated designation |
|---|---|
| L-alanine | ala |
| L-glutamic acid | glu |
| L-histidine | his |
| L-leucine | leu |
| L-lysine | lys |
| L-proline | pro |
| L-serine | ser |
| L-threonine | thr |
| L-valine | val |

Derivatives; protecting groups:

| | |
|---|---|
| N-carboxyanhydride | NCA |
| N-thiocarboxyanhydride | TCA |
| Benzyloxycarbonyl (carbobenzoxy) | Cbz |
| Tertiary-butyloxycarbonyl | tBOC |
| N-hydroxysuccinimide ester | NHS |
| Methyl ester | OMe |

In accordance with the present invention, hemopeptide H is prepared by stepwise coupling (by peptide linkages) of each of its individual amino acid components, which peptide coupling is conducted by reacting the appropriate amino acid in the sequence (as a derivative in which the carboxyl grouping is activated and any amino groups are protected) first with alanine (the amino acid at the C-terminus i.e. carboxy end of the decapeptide chain), and then subsequently with each resulting polypeptide intermediate, such stepwise method being referred to herein as sequential synthesis. When this sequential synthesis is conducted in solution, it is ordinarily preferred to utilize, as the carboxyl-activated amino acid, the amino acid NCA, the amino acid TCA, the amino acid azide, or an activated ester such as the NHS ester of such amino acid. These NCA and TCA sequential synthesis procedures are more fully described in French Pat. 1,497,536, granted Sept. 4, 1967.

Aternatively, hemopeptide H is prepared using solid phase sequential synthesis procedure starting from the C-terminus. In this procedure, the carboxyl end of the terminal amino acid, alanine (and of the polypeptide product in the following steps) is bound covalently to an insoluble polymeric resin support, as for example as the carboxylic ester of the resin-bonded benzyl alcohol present in hydroxymethyl-substituted polystyrene-divinylbenzene resin. In this solid phase procedure, the peptide coupling may involve direct condensation between the free carboxyl of an amino acid reactant and the amino group of the resin-bonded alanine or polypeptide. Such reaction is ordinarily conducted in the presence of a coupling agent such as dicyclohexylcarbodiimide, although the amino acid reactant may be employed in the form of a carboxyl-activated amino acid such as the NHS ester, an amino acid azide, and the like.

Instead of sequential synthesis, hemopeptide H can also be prepared by block synthesis, wherein various peptide segments of the hemopeptide H chain are individually synthesized, and these segments are then coupled in proper sequence to form the desired decapeptide product. These peptide segments are themselves conveniently prepared by sequential synthesis in solution using the NCA, TCA, azide or NHS ester procedure, or by solid phase sequential synthesis using carboxyl-activated NHS ester or amino acid azide or, if desired, a free carboxyl-containing amino acid reactant in conjunction with a coupling agent. The number of amino acid components in the peptide segments used in block synthesis of hemopeptide H may vary from two to eight, but peptide segments containing five amino acid components or less are preferably utilized, thus avoiding condensations involving larger peptide segments with attendant losses of these more valuable higher peptide fragments.

In carrying out these sequential or block syntheses, involving reaction between carboxyl (or activated carboxyl) of one amino acid and amino grouping of the other, it is ordinarily preferred to protect the amino groupings in the amino acid or peptide undergoing reaction at the carboxyl end of the molecule, as well as other functional groupings in both reactants reactive under conditions of such syntheses. Protecting groups must retain their protecting properties under the peptide coupling conditions, and must be selectively removable without affecting peptide linkages. Protecting groups to be removed following a particular step must also be selectively removable without affecting other protecting groups to be retained in later coupling steps.

Amino-protecting groups ordinarily employed include salt formation particularly useful for protecting strongly-basic amino groups, acyl-type substituents such as formyl, phthalyl, trifluoroacetyl, toluenesulfonyl, dibenzylphosphoryl, nitrophenylsulfenyl, tritylsulfenyl, o-nitrophenoxyacetyl, and the like, urethane protecting substituents such as benzyloxy-carbonyl (carbobenzoxy), p-methoxycarbobenzoxy, p-nitrocarbobenzoxy, t-butyloxycarbonyl, 2-(p-biphenylyl)-2-propyloxycarbonyl, isonicotinyloxycarbonyl, and the like, alkyl-type substituents such as triphenylmethyl, trialkylsilyl, trimethyl-silyl, and the like. It is preferred to utilize tert-butyloxycarbonyl (tBOC) for protecting the α-amino group in the amino acids (or peptides) undergoing reaction at the carboxyl end of the molecule, since the tBOC protecting group is readily removed following such reaction and prior to the subsequent step (wherein such α-amino group itself undergoes reaction), by relatively mild action of acids (e.g. trifluoroacetic acid for 5–10 minutes) which mild acid treatment does not affect groupings, such as carbobenzoxy (Cbz) and isonicotinyloxycarbonyl, used to protect other amino groups such as the ε-amino group of lysine, and removable by vigorous action of a strong acid cleaving agent (e.g. hydrogen bromide in glacial acetic acid or anhydrous hydrogen fluoride in the presence of anisole for approximately one hour).

Carboxyl-protecting groups ordinarily employed include amides, salt formation, ester substituents such as the methyl and ethyl esters (which are preferred where subsequent conversion, via the hydrazide, to the azide is desired), the benzyl ester, and particularly the resin-bonded benzyl ester, used in solid phase synthesis (which reacts directly with hydrazine to cleave the peptide from the resin and form the peptide hydrazide), p-nitrobenzyl-ester, t-butyl ester, and the like. Hydroxy groupings are ordinarily not protected in the synthesis of hemopeptide H where the coupling reactions are conducted in solution, although tetrahydropyranyl, benzyl, trifluoroacetyl, t-butyl, and the like, may be used for such protection if desired. It is usually preferred, however, to use these O-protecting substituents, and particularly the O-benzyl and O-t-butyl groups, when utilizing solid phase synthesis for the preparation of hemopeptide H, or of threonine or serine-containing segments of the hemopeptide chain. The imidazole nitrogen of histidine may also be protected, if desired, preferably using an N-hydrocarbon (or substituted-hydrocarbon) substituent such as N-benzyl, N-(2,4-dinitrophenyl), and the like.

The selection of protecting groups is in part dictated by particular coupling conditions, in part by the amino acid and peptide components involved in the reaction. Guides for selecting particular protecting groups to be employed herein are set forth in detail in the aforesaid French Pat. 1,496,536, and the protecting groups disclosed in that patent are incorporated herein by reference.

The preferred overall procedure for preparation of hemopeptide H is set forth diagrammatically in Figure 1 as follows:

This preferred overall procedure involves the combination of sequential and block syntheses, where certain peptide segments of the decapeptide chain are initially formed by the stepwise method, either by sequential synthesis in solution or by solid phase, sequential synthesis, and these segments are then coupled in proper sequence. In this procedure, the tBOC substituent is used to protect α-amino groupings, the Cbz substituent is used to protect the ε-amino group of lysine, and the methyl ester substituent is used to protect the carboxy groups of alanine, leucine, and threonyl-proline; in the latter two instances, the methyl ester serves the further purpose of providing the intermediates for preparing, via the hydrazine, tBOC-val-his-leu azide and tBOC-val-his-leu-thr-pro azide. Instead of this preferred method, however, the present invention also contemplates the various permutations of alternate routes, and employment of other protecting groupings fulfilling criteria hereinabove discussed, such alternate routes likewise involving sequential synthesis in solution, sequential synthesis in solid phase, and combinations of sequential and block synthesis procedures.

As reference to Figure 1 will show, the preferred overall procedure for preparing hemopeptide H specifically involves sequential synthesis in solution of (a) the protected pentapeptide segment, glu-glu-ε-Cbz-lys-ser-ala, and (b) the carboxyl-activated, protected pentapeptide segment, tBOC-val-his-leu-thr-pro azide. The former pentapeptide is prepared by reacting alanine methyl ester with the NHS ester of N-tBOC-serine in dimethylformamide under mildly alkaline conditions (preferably pH 8.0). The resulting dipeptide, tBOC-ser-ala-OMe is subjected to selective treatment with acid, preferably trifluoroacetic acid, thereby removing the tBOC protecting group and forming the free α-amine, ser-ala-OMe. The ser-ala-OMe is reacted in dimethylformamide with the NHS ester of α-tBOC-ε-Cbz-lysine to form α-tBOC-ε-Cbz-lys-ser-ala-OMe. This protected tripeptide is reacted first with aqueous alkaline solution, thereby hydrolyzing the methyl ester grouping; and then with trifluoroacetic acid, thereby removing the tBOC protecting group, to form

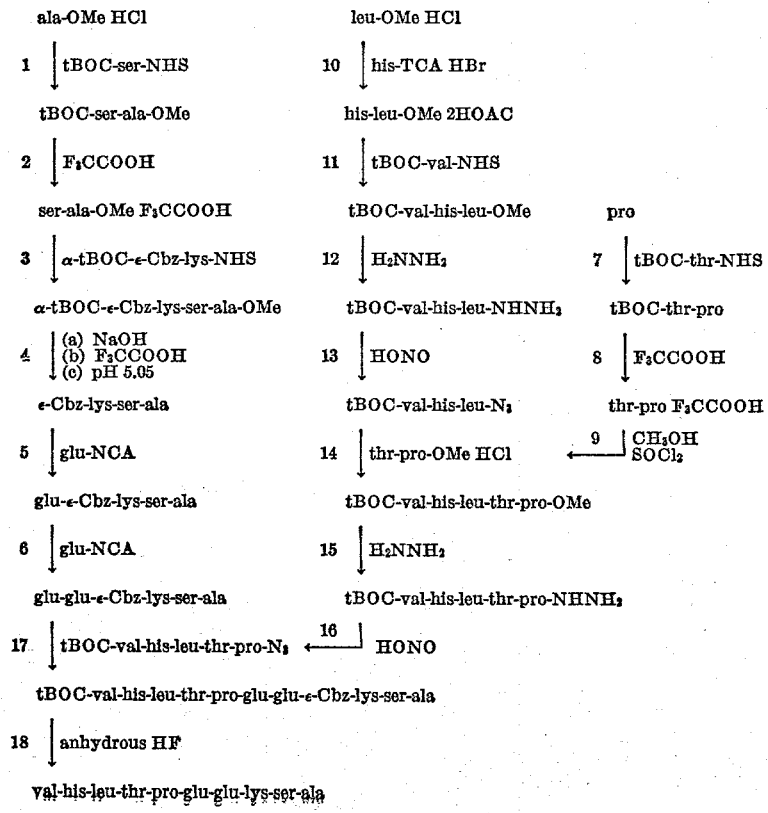

ε-Cbz-lys-ser-ala, which protected tripeptide is precipitated from aqueous solution by adjusting the pH to 5.05.

This ε-Cbz-lys-ser-ala is reacted with the N-carboxyanhydride of glutamic acid (glu-NCA), which reaction is conducted by bringing the reactants together in aqueous solution with vigorous agitation at pH 10.1, under which conditions reaction is ordinarily complete in about one to two minutes. The alkaline reaction solution is acidified, thereby decomposing the intermediate carbamate to form a solution of glu-ε-Cbz-lys-ser-ala which, after adjusting the pH to 10.1, is then reacted with vigorous agitation with additional glu-NCA. The reaction solution is acidified, thereby decomposing the intermediate carbamate, and the pH of the aqueous solution is adjusted to 3.6, thereby precipitating the protected pentapeptide, glu-glu-ε-Cbz-lys-ser-ala.

The terminal dipeptide segment of the other pentapeptide, in the form of its methyl ester hydrochloride thr-pro-OMe HCl, is prepared by first reacting proline with the NHS ester of N-tBOC-threonine in dimethylformamide solution under alkaline conditions (preferably pH 10.0) thereby forming tBOC-thr-pro; this dipeptide is treated with trifluoroacetic acid thereby forming thr-pro trifluoroacetate. This thr-pro trifluoroacetate is then reacted with methanol in the presence of thionyl chloride catalyst, thereby forming the methyl ester of thr-pro which is recovered from the reaction mixture in the form of its hydrochloride.

The tripeptide in the hemopeptide H sequence still to be synthesized, namely val-his-leu, is prepared by reacting leucine methyl ester with the N-thiocarboxyanhydride of histidine (which is added as his-TCA HBr) in aqueous solution with vigorous agitation at pH 9.5, under which conditions the reaction is ordinarily complete in about 20 minutes. The alkaline reaction solution is acidified thereby decomposing intermediate thiocarbamate, and the acidified reaction solution is adjusted to pH 5.0, filtered to remove impurities, and evaporated in vacuo to give the dipeptide his-leu in the form of its methyl ester; the crude material so obtained is purified by chromatography on silica gel using n-butanol:acetic acid:water as eluant to give his-leu-OMe diacetate. This his-leu-OMe diacetate is reacted with the NHS ester of N-tBOC-valine in dimethylformamide solution under mildly alkaline conditions (pH is adjusted to 8.0 with triethylamine) to form the tripeptide, tBOC-val-his-leu-OMe, which is reacted with hydrazine, and the resulting hydrazide treated with nitrous acid, thereby forming tBOC-val-his-leu azide.

The tBOC-val-his-leu azide is reacted with thr-pro-OMe in dimethylformamide solution under mildly alkaline conditions (preferably pH 8.0) to form the corresponding protected pentapeptide, tBOC-val-his-leu-thr-pro-OMe, which is, in turn, reacted with hydrazine, and the hydrazide treated with nitrous acid, thereby forming tBOC-val-his-leu-thr-pro azide.

The two protected pentapeptides, glu-glu-ε-Cbz-lys-ser-ala and tBOC-val-his-leu-thr-pro azide are reacted in dimethylformamide solution under mildly alkaline conditions (preferably pH 8.0), thereby forming the protected rated in vacuo to give, as a residual oil, tBOC-ε-Cbz-lys-ser-ala.

The tBOC-val-his-leu-thr-pro-glu-glu-ε-Cbz-lys-ser-ala, or other protected derivative of hemopeptide H, is then subjected to the vigorous action of a strong acid cleaving agent as for example anhydrous hydrohalic acid per se, or in solution in anhydrous non-hydroxylic, non-basic, organic solvent for said hydrohalic acid, as for example anhydrous hydrogen fluoride, hydrogen bromide in glacial acetic acid, hydrogen chloride in ethyl acetate, and the like, thereby removing the protecting groups to form val-his-leu-thr-pro-glu-glu-lys-ser-ala, the unsubstituted hemopeptide H. It is generally advantageous to utilize in this strong acid cleaving reaction a carbonium ion scavenger such as anisole, veratrole, dimethyl-sulfide, methionine, and the like, which serves to trap the liberated protecting substituent, following cleavage, in a non-reactive form.

While it is preferred, in the practice of this invention, to employ the foregoing protected pentapeptide and decapeptide derivatives, other amino-protecting groups such as those outlined hereinabove may be utilized; in addition the carboxy group of alanine, the imidazole nitrogen of histidine, and the hydroxy groups of threonine and serine may also be protected as hereinabove disclosed. Thus, the novel peptide compositions of the present invention include hemopeptide H per se, protected derivatives thereof, and protected derivatives of the intermediate pentapeptides val-his-leu-thr-pro and glu-glu-lys-ser-ala, in which derivatives the α-amino group of valine and the ε-amino group of lysine are protected with amino-protecting substituents characterized as being removable without substantial cleavage of peptide bonds; and in which the imidazole nitrogen of histidine, the hydroxyl group of threonine, and/or the hydroxyl group of serine are optionally protected by protecting groups similarly characterized as being removable without substantial cleavage of peptide bonds.

Hemopeptide H, its amides such as val-his-leu-thr-pro-glu-glu-lys-ser-ala-$NH_2$, its esters such as val-his-leu-thr-pro-glu-glu-lys-ser-ala acetate, val-his-leu-thr-pro-glu-glu-lys-ser-ala phosphate, its N-acyl derivatives such as N-formyl-val-his-leu-thr-pro-glu-glu-lys-ser-ala, N-acetyl-val-his-leu-thr-pro-glu-glu-lys-ser-ala, and the like, as well as protected derivatives of hemopeptide H, such as tBOC-val-his-leu-thr-pro-glu-glu-ε-Cbz-lys-ser-ala, are useful in inducing release of hormone substances by living systems of the vertebrates, and are particularly valuable for effecting release and synthesis of growth hormones by cells of the anterior pituitary of mammals; hemopeptide H and substituted derivatives thereof are of value in promoting rapid and/or maximal growth of mammals, and are of remedial value in certain types of dwarfism. Hemopeptide H and its substituted derivatives are conveniently administered by injection, or by absorption through mucous membranes (e.g. by sublingual, intranasal, etc. administration); oral administration may also be employed using derivatives resistant to gastric digestion. In order to obtain a direct effect on the anterior pituitary, intra-carotid injection is ordinarily utilized at a dosage level of about 0.05–0.5 microgram per kg. of body weight per day to obtain growth hormone release, and up to about 0.1 milligram per kg. of body weight for an individual dose where synthesis of growth hormone is desired.

The following examples illustrate methods of carrying out the present invention, but it is to be understood that these examples are given for purpose of illustration and not of limitation.

EXAMPLE 1

About 5.56 g. of ala-OME hydrochloride and about 12.08 g. of the NHS ester of tBOC-ser are dissolved in 400 ml. of freshly degassed dimethylformamide. The resulting solution is adjusted to pH 8.0 by the addition of diisopropylethylamine, and stirred for a period of about four hours, while maintaining the temperature at about 25° C. and the pH at 8.0 by the addition of diisopropylethylamine. The reaction mixture is evaporated in vacuo, the residual oil is dissolved in methylene chloride, and the methylene solution is washed twice with 0.2 N aqueous sulfuric acid solution saturated with sodium sulfate, once with saturated aqueous sodium chloride solution, twice with saturated aqueous sodium bicarbonate solution, and finally twice with saturated aqueous sodium chloride solution. The washed methylene chloride solution is then dried over anhydrous sodium sulfate, evaporated in vacuo, and the residual oil is crystallized from ethyl acetate-hexane to give about 9.08 g. of crystalline tBOC-ser-ala-OMe.

EXAMPLE 2

About 6.0 g. of this tBOC-ser-ala-OMe is dissolved (at a temperature of about 0° C.) in the minimum quantity of trifluoroacetic acid, the solution is stirred at a temperature of about 25° C. for a period of about 45 minutes, and the solution is then added dropwise with vigorous stirring to a large volume (about 100 ml.) of ether. The material which precipitates is recovered by filtration, washed with ether, and dried in vacuo to give about 4.97 g. of ser-ala-OMe trifluoroacetate.

EXAMPLE 3

About 2.43 g. of ser-ala-OMe trifluoroacetate and about 3.82 g. of the NHS ester of tBOC-$\epsilon$-Cbz-lys are dissolved in 85 ml. of freshly degassed dimethylformamide. The resulting solution is adjusted to pH 8.0 by the addition of triethylamine, and stirred for a period of about four hours while maintaining the temperature at about 25° C. and the pH at 8.0 by the addition of triethylamine. The reaction mixture is filtered and evaporated in vacuo, the residual syrup is dissolved in 200 ml. chloroform, and the chloroform solution is washed with 0.1 N aqueous sulfuric acid solution, then with saturated aqueous sodium bicarbonate solution, and finally with water. The washed chloroform solution is then dried over anhydrous sodium sulfate, evaporated in vacuo, and the residual oil is crystallized from ethyl acetate-ether to give about 3.15 g. of crystalline tBOC-$\epsilon$-Cbz-lys-ser-ala-OMe.

EXAMPLE 4

A solution of about 3.15 g. of tBOC-$\epsilon$-Cbz-lys-ser-ala-OMe in 20 ml. dioxane is added to 200 ml. of water while holding the pH at 11.5 by the addition of 1 N aqueous sodium hydroxide solution. The resulting solution is stirred at a temperature of about 25° C. for a period of three hours while maintaining the pH at 11.5. The dioxane is evaporated from the reaction solution in vacuo, water is added to the residual solution to bring the volume to approximately 200 ml., and the aqueous solution is washed with three 200 ml.-portions of ethyl acetate. The aqueous solution is then adjusted to pH 2.5 by the addition of sulfuric acid, and the acidified aqueous solution is extracted with three 200 ml.-portions of ethyl acetate. The combined ethyl acetate extracts are evaporated in vacuo to give, as a residual oil, tBOC-$\epsilon$-Cbz-lys-ser-al.

This residual oil is dissolved in 15 ml. of methylene chloride; the methylene chloride solution is cooled to about 5° C.; about 15 ml. of trifluoroacetic acid is added to the cold solution; and the resulting solution is allowed to warm to about 25° C. over a 5 minute period. The reaction solution is cooled to 0° C., about 200 ml. ether is added thereto with stirring, and the material which precipitates is recovered by filtration, washed with ether, and dried to give $\epsilon$-Cbz-lys-ser-ala trifluoroacetate.

This $\epsilon$-Cbz-lys-ser-ala trifluoroacetate is dissolved in about 25 ml. of water, the pH is adjusted to 5.05 by the addition of dilute aqueous sodium hydroxide solution, and the crystalline material which separates is recovered by filtration and dried to give about 1.4 g. of $\epsilon$-Cbz-lys-ser-ala.

EXAMPLE 5

About 0.88 g. of the $\epsilon$-Cbz-lys-ser-ala is dissolved in 20 ml. of 1 M aqueous potassium borate buffer solution (pH=10.1), the solution is cooled to about 0° C., and about 0.36 g. of glu-NCA is added to the solution over a period of about 0.5 minute, during which time the mixture is vigorously agitated (preferably using a Waring Blender) while maintaining the temperature at 0° C. and the pH at 10.1 by the dropwise addition of 50% aqueous potassium hydroxide solution. The reaction is allowed to proceed, while continuing agitation and maintaining temperature at 0° C. and pH at 10.1, until base consumption ceases (approximately 1 minute); sufficient concentrated sulfuric acid is added to bring pH to 2.5, and nitrogen is bubbled through the acidified reaction mixture for about 15 minutes, thereby sweeping carbon dioxide from the resulting solution of glu-$\epsilon$-Cbz-lys-ser-ala.

EXAMPLE 6

The solution of glu-$\epsilon$-Cbz-lys-glu-ala, prepared as described in Example 5, is cooled to 0° C., the pH is adjusted to 10.1 by the addition of 50% aqueous potassium hydroxide solution, and about 0.38 g. of glu-NCA is added to the solution over a period of about 0.5 minute, while vigorously agitating the mixture and maintaining the temperature at 0° C. and the pH at 10.1 by the addition of 50% aqueous potassium hydroxide solution. The reaction is allowed to proceed, while continuing agitation and maintaining temperature at 0° C. and pH at 10.1, until base consumption ceases (approximately 1 minute). The pH of the reaction solution is adjusted to 8.5, and the solution is filtered thereby removing a small amount of precipitated material; sufficient concentrated sulfuric acid is added to the filtered solution to bring pH to 3.6; and the material which now precipitates is recovered by filtration, washed with water, and dried in vacuo to give about 1.3 g. of glu-glu-$\epsilon$-Cbz-lys-ser-ala, which may contain some tetrapeptide and hexapeptide impurities. This material is subjected to free-flowing electrophoresis at pH 7.0 in 0.143 M 2,6-lutidine-acetic acid buffer, to give about 0.2 g. of substantially pure glu-glu-$\epsilon$-Cbz-lys-ser-ala.

EXAMPLE 7

About 10.3 g. of pro are added to a solution of about 28.5 g. of the NHS ester of tBOC-thr in 900 ml. of freshly degassed dimethylformamide; the resulting suspension is adjusted to pH 10.0 by the addition of triethylamine; and the suspension is stirred for a period of about 60 hours, while maintaining the temperature at about 25° C. and pH at 10.0. The reaction mixture is evaporated in vacuo, the residual material is dissolved in 900 ml. water, the solution is filtered thereby removing a small amount of impurities, and the pH of the filtered solution is adjusted to 2.5 by addition of 6 N aqueous hydrochloric acid solution. The aqueous solution is extracted with three 1200 ml.-portions of ethyl acetate, and the combined ethyl acetate extracts are dried over anhydrous sodium sulfate, and evaporated in vacuo to give about 26 g. of amorphous tBOC-thr-pro.

EXAMPLE 8

About 25 g. of this t-BOC-thr-pro is dissolved (at a temperature of about 0° C.) in approximately the minimum quantity of trifluoroacetic acid to effect solution; the solution is stirred at a temperature of about 25° C. for a period of about 7 minutes, and to the reaction solution is slowly added with stirring about 400 ml. of ether. The material which precipitates is recovered by filtration, washed with ether, and dried in vacuo to give about 14 g. of thr-pro trifluoroacetate.

EXAMPLE 9

To 200 ml. of cold methanol (temperature of about −10° C.) is added, dropwise with stirring, about 10 ml. of thionyl chloride. The solution is stirred at −10° C. for about 15 minutes, about 10 g. of thr-pro-trifluoroacetate is added thereto, and the resulting solution is stirred at a temperature of 25° C. for a period of about three hours. The reaction mixture is filtered, the filtered solution is evaporated to dryness, the residual material is triturated with ether, and the solid amorphous material is recovered by filtration and dried to give about 7 g. of thr-pro-OMe hydrochloride.

EXAMPLE 10

About 4.34 g. of leu-OMe hydrochloride is dissolved in about 240 ml. of 1 M aqueous potassium borate buffer solution (pH=9.5), the solution is cooled to about 0° C., and about 10.01 g. of his-TCA hydrobromide is added to the solution over a period of 10 minutes, during which time the mixture is vigorously agitated while maintaining the temperature at 0° C. and the pH at 9.5 by the dropwise addition of 50% aqueous potassium hydroxide solution. The reaction is allowed to proceed, while continuing agitation and maintaining temperature at 0° C. and pH at 9.5, until base consumption ceases (about 10 minutes); sufficient concentrated sulfuric acid is added to bring pH to 5.0; the acidified reaction solution is filtered, and the filtered solution is evaporated to dryness in vacuo. The residual material, which contains both his and leu-OMe, is subjected to chromatography on silica gel using n-butanol-acetic acid-water (10:2.3:6) as eluant, to give about 7.0 g. of substantially pure his-leu-OMe diacetate.

EXAMPLE 11

About 2.4 g. of his-leu-OMe diacetate is dissolved in 140 ml. of dimethylformamide, about 2.23 g. of NHS ester of tBOC-val is added with stirring at 25° C., and the pH of the solution is adjusted to 8.0 by the addition of triethylamine. The resulting solution is allowed to stand for a period of about 20 hours, with occasional adjustment of the pH to 8.0 by addition of triethylamine. The reaction solution is evaporated to dryness in vacuo, and residual material is dissolved in 400 ml. of water. The aqueous solution is extracted with three 400 ml.-portions of chloroform. The combined organic extracts are dried over anhydrous sodium sulfate, evaporated to dryness in vacuo, and the residual oil is triturated with ether to give a crystalline material which is recovered by filtration and dried to give about 1.96 g. of tBOC-val-his-leu-OMe.

EXAMPLE 12

To about 2.8 g. of tBOC-val-his-leu-OMe is added 20 ml. of 1:1 mixture of anhydrous hydrazine and methanol. The resulting mixture is stirred for about 3 minutes at room temperature (solution is ordinarily complete in about 1 minute, and precipitate forms after about 2 minutes), and the reaction mixture is then evaporated in vacuo at a temperature of about 35° C. About 10 ml. of ethanol is added to the residual material, and the resulting mixture is evaporated in vacuo; about 10 ml. of dimethylformamide is then added and the resulting mixture is evaporated in vacuo. The residual solid is dried in vacuo at room temperature for a period of about 15 hours, and crystallized from methanol to give about 2.2 g. of tBOC-val-his-leu hydrazide.

EXAMPLE 13

About 1.0 g. of tBOC-val-his-leu hydrazide, prepared as described in Example 12, is suspended in 30 ml. of freshly degassed dimethylformamide, and the suspension is cooled to a temperature of —40° C. and maintained under a dry nitrogen atmosphere to exclude moisture. To the cold suspension is added, with stirring, a solution of 6.24 ml. of 2 N hydrogen chloride in tetrahydrofuran followed by 0.3 ml. of isoamylnitrite. The resulting mixture is maintained under a dry nitrogen atmosphere at a temperature of —15° C. to —20° C. for a period of about 1 hour, at the end of which time the hydrazide has completely reacted to form tBOC-val-his-leu azide, as may be demonstrated by thin layer chromatography on silica gel G using the solvent system chloroform-ethanol-water (5:5:1).

EXAMPLE 14

The reaction solution containing tBOC-val-his-leu azide, prepared as described in Example 13, is cooled to a temperature of —40° C., and to this is added a solution of 555 mg. of thr-pro-OMe hydrochloride in 10 ml. of degassed dimethylformamide. The pH of the resulting solution is adjusted to 8.0 by the addition of diisopropylethylamine, and the mixture is maintained at a temperature between about —20° C. and —15° C. (with periodic adjustment of the pH to 8.0 by addition of diisopropylethylamine) for a period of about 20 hours, at the end of which time the reaction to form the pentapeptide is substantially complete as may be shown by thin layer chromatography on silica gel G using the solvent system ethyl acetate-pyridine-acetic acid-water (10:5:1:3). The reaction solution is evaporated in vacuo; the residual material is dissolved in water, and the solution is purified by passage through Sephadex gel G–10 to give about 0.8 g. of substantially pure tBOC-val-his-leu-thr-pro-OMe.

EXAMPLE 15

To about 790 mg. of tBOC-val-his-leu-thr-pro-OMe is added 9 ml. of an anhydrous 1:1 mixture of hydrazine and methanol. The resulting mixture is stirred for about 3 minutes at room temperature, at the end of which time solution is substantially complete. The resulting solution is evaporated in vacuo at a temperature of about 35° C., about 10 ml. of ethanol is added to the residual material, and the resulting solution is evaporated in vacuo. The residual material is dissolved in a minimum quantity of chloroform-methanol-water (60:40:10), and the solution is passed through a dry column of 50 g. of silica gel H, thereby removing traces of unreacted hydrazine (as shown by thin layer chromatography on silica gel G) and the solvent is evaporated in vacuo to give about 480 mg. of tBOC-val-his-leu-thr-pro hydrazide.

EXAMPLE 16

About 528 mg. of tBOC-val-his-leu-thr-pro hydrazide, prepared as described in Example 15, is dissolved in 100 ml. of freshly degassed dimethylformamide; the solution, which is maintained under a dry nitrogen atmosphere, is cooled to about —40° C., and about 9.6 ml. of 2 N anhydrous hydrogen chloride in tetrahydrofuran is added with stirring. About 0.11 ml. of isoamylnitrite is then added, and the resulting mixture is maintained at a temperature between about —20° C. and —15° C. for a period of about one hour, at the end of which time the hydrazide has completely reacted to form tBOC-val-his-leu-thr-pro azide, as may be demonstrated by thin layer chromatography, utilizing the solvent system chloroform-methanol-water (60:40:10).

EXAMPLE 17

To the solution of tBOC-val-his-leu-thr-pro azide in dimethylformamide, prepared as described in Example 16, is added about 515 mg. of glu-glu-ε-Cbz-lys-ser-ala, and the mixture is stirred at about —20° C. until the latter goes into solution. The temperature of the solution is then adjusted to —40° C., the pH is adjusted to 8 by the addition of diisopropylethylamine, and the solution is maintained at a temperature between about —20° C. and —15° C., with periodic adjustment of pH to 8.0 by addition of diisopropylethylamine, for a period of about 20 hours, at the end of which time the reaction to form the decapeptide is substantially complete, as may be shown by thin layer chromatography on silica gel G using the solvent system ethyl acetate-pyridine-acetic acid-water (10:5:1:3). The reaction mixture, which contains a gelatinous precipitate, is evaporated in vacuo; the residual material is dissolved in 50% aqueous acetic acid, and the solution passed through a G–25 fine gel filtration column (thereby separating a small amount of impurity) to give about 400 mg. of tBOC-val-his-leu-thr-pro-glu -glu-ε-Cbz-lys-ser-ala.

EXAMPLE 18

About 40 mg. of tBOC-val-his-leu-thr-pro-glu-glu-ε-Cbz-lys-ser-ala is dried in vacuo over phosphorus pentoxide for a period of about 15 hours, thereby removing traces of water, and the resulting dry material is placed in a polyethylene tube containing about 0.3 ml. of anisole. The mixture is cooled to a temperature of about —35° C., one ml. of anhydrous hydrogen fluoride is condensed in the tube, and the resulting mixture is stirred at a temperature of about 0° C. for a period of about 45 minutes. At the end of this reaction period, a stream of dry nitrogen is passed through the mixture (still at 0° C.), thereby removing excess hydrogen fluoride. The residual material is held in vacuo at a temperature of about 25° C. for a period of about 20 minutes, dissolved in aqueous acetic acid, and the aqueous acetic acid solution is freeze-dried to give about 41 mg. of amorphous product which is crystallized from water-ethanol to give substantially pure val-his-leu-thr-pro-glu-glu-lys-ser-ala.

Various changes and modifications may be made in carrying out the present invention without departing from the spirit and scope thereof. Insofar as these changes and modifications are within the purview of the annexed claims, they are to be considered as part of this invention.

What is claimed is:

1. The process, which comprises reacting ala-OMe with tBOC-ser-NHS to form the protected dipeptide tBOC-ser-ala-OMe, reacting this dipeptide with trifluoroacetic acid thereby cleaving the tBOC substituent to form ser-ala-OMe, reacting the ser-ala-OMe with α-tBOC-ε-Cbz-lys-NHS to form the protected tripeptide α-tBOC-ε-Cbz-lys-ser-ala-OMe, reacting this tripeptide with aqueous alkali thereby hydrolyzing the methyl ester grouping and reacting the hydrolysis product with trifluoroacetic acid thereby removing the tBOC substituent to form ε-Cbz-lys-ser-ala, reacting the latter compound with glu-NCA to form the protected tetrapeptide glu-ε-Cbz-lys-ser-ala, and reacting the glu-ε-Cbz-lys-ser-ala with glu-NCA to form glu-glu-ε-Cbz-lys-ser-ala; reacting leu-Ome with his-TCA to form the dipeptide ester his-leu-OMe, reacting this dipeptide ester with tBOC-val-NHS to form the protected tripeptide ester tBOC-val-his-leu-OMe, reacting this protected tripeptide ester with hydrazine and then reacting the resulting hydrazide with nitrous acid to form tBOC-val-his-leu azide; reacting pro with tBOC-thr-NHS to form tBOC-thr-pro, reacting the latter with trifluoroacetic acid thereby cleaving the tBOC substituent to form thr-pro, reacting the thr-pro with a methylating agent to form thr-pro-OMe, reacting this thr-pro-OMe with the said tBOC-val-his-leu azide to produce protected pentapeptide ester tBOC-val-his-leu-thr-pro-OMe, reacting this protected pentapeptide ester with hydrazine and then reacting the resulting hydrazide with nitrous acid to form tBOC-val-his-leu-thr-pro azide; and reacting this tBOC-val-his-leu-thr-pro azide with the said glu-glu-ε-Cbz-lys-ser-ala to form the protected decapeptide, tBOC-val-his-leu-thr-pro-glu-glu-ε-Cbz-lys-ser-ala; and reacting said protected decapeptide with anhydrous hydrogen fluoride to form hemopeptide H.

2. A compound selected from the group consisting of hemopeptide H; hemopeptide H amide; lower alkyl and benzyl esters of hemopeptide H; hemopeptide H lower alkanoates hemopeptide H phosphate; and N-acyl derivatives of the foregoing in which the N-acyl substituent is selected from the group consisting of lower alkanoyl, t-butyloxycarbonyl, phthalyl, trifluoroacetyl, toluenesulfonyl, dibenzylphosphoryl, nitrophenylsulfenyl, tritylsulfenyl, o - nitrophenoxy - acetyl, benyloxycarbonyl p-methoxycarbobenzoxy, p-nitrocarbobenzoxy, 2-(p-diphenylyl)-2-propyloxycarbonyl and isonicotinyloxycarbonyl.

3. Hemopeptide H, having the chemical structure val-his-leu-thr-pro-glu-glu-lys-ser-ala.

4. A decapeptide compound, as defined in claim 2, having the chemical structure val-his-leu-thr-pro-glu-glu-lys-ser-ala-NH₂.

5. A decapeptide compound, as defined in claim 2, having the chemical structure val-his-leu-thr-pro-glu-glu-lys-ser-ala acetate.

6. The protected decapeptide derivative, as defined in claim 2, having the structure tBOC-val-his-leu-thr-pro-glu-glu-ε-Cbz-lys-ser-ala.

7. A compound selected from the group consisting of the pentapeptide glu-glu-lys-ser-ala, its lower alkyl and benzyl esters, and N-acyl derivatives of said pentapeptide in which the N-acyl substituent is selected from the group consisting of the pentapeptide glu-glu-lys-ser-ala, its lower alkanoyl, t-butyloxycarbonyl, phthalyl, trifluoroacetyl, toluenesulfonyl, dibenzylphosphoryl, nitrophenylsulfenyl, tritylsulfenyl, o-nitrophenoxy-acetyl, benzyloxycarbonyl, p - methoxycarbobenzoxy, p-nitrocarbobenzoxy, 2-(p-biphenylyl)-2-propyloxycarbonyl and isonicotinylcarbonyl.

8. The protected pentapeptide derivative, as defined in claim 7, having the structure glu-glu-ε-Cbz-lys-ser-ala.

9. A compound selected from the group consisting of the pentapeptide val-his-leu-thr-pro, its lower alkyl and benzyl esters, and N-acyl-derivatives of said pentapeptide in which the N-acyl substituent is selected from the group consisting of lower alkanoyl, t-butyloxycarbonyl, phthalyl, trifluoroacetyl, toluenesulfonyl, dibenzylphosphoryl, nitrophenylsulfenyl, tritylsulfenyl, o - nitro - phenoxy - acetyl, benzyloxycarbonyl, p-methoxycarbobenzoxy, p-nitrocarbobenzoxy, 2 - (p - biphenylyl)-2-propyloxycarbonyl and isonicotinyloxycarbonyl.

10. The pentapeptide derivative, as defined in claim 9, having the structure tBOC-val-his-leu-thr-pro azide.

11. The protected tetrapeptide derivative having the structure glu-ε-Cbz-lys-ser-ala.

12. A protected tripeptide selected from the group consisting of ε-Cbz-lys-ser-ala and α-tBOC-ε-Cbz-lys-ser-ala-OMe.

13. A protected tripeptide selected from the group consisting of t-BOC-val-his-leu-OMe, tBOC-val-his-leu-hydrazide and tBOC-val-his-leu azide.

References Cited

UNITED STATES PATENTS

| | | | |
|---|---|---|---|
| 3,518,240 | 6/1970 | Tilak et al. | 260—111.2 |
| 3,546,198 | 12/1970 | Mazur | 260—112.5 |
| 3,625,531 | 3/1972 | Miyoshi et al. | 260—112.5 |

OTHER REFERENCES

Sakakibara et al.: "Bull. of the Chem. Soc. of Japan," vol. 40 (1967), pp. 2164–2167.

ELBERT L. ROBERTS, Primary Examiner

U.C. Cl. X.R.

424—177